Sept. 8, 1942. P. DI CESARE 2,295,454
PROPELLER BLADE
Filed Jan. 22, 1940
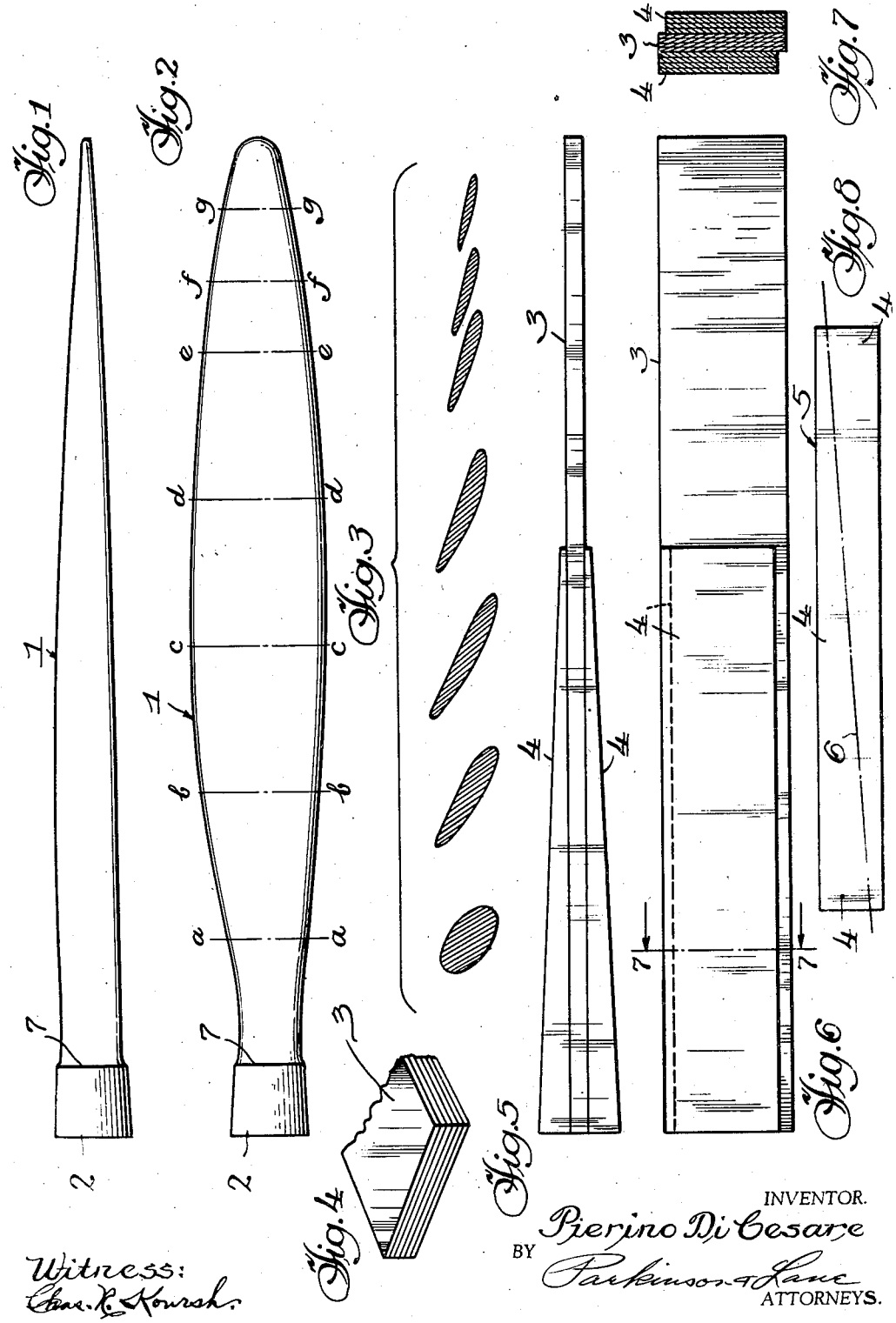
INVENTOR.
Pierino Di Cesare
BY Parkinson + Lane
ATTORNEYS.

Patented Sept. 8, 1942

2,295,454

UNITED STATES PATENT OFFICE 2,295,454

PROPELLER BLADE

Pierino Di Cesare, Oak Park, Ill., assignor to Di Cesare Offset Propeller Corporation, Chicago, Ill., a corporation of Illinois Application January 22, 1940, Serial No. 314,907

1 Claim. (Cl. 144—309)

The present invention relates to an improvement in propeller construction and more particularly to a novel blade construction and method of manufacture.

In the novel embodiment disclosed in the drawing, the blade is formed completely of wood laminations suitably impregnated and compressed to form a compact unit having great inherent strength and adapted to give optimum efficiency in use with a minimum of distortion under operating conditions.

In the novel method of manufacture, the initial step consists in forming a laminated board of substantially rectangular shape and of substantially the ultimate or maximum length, width and thickness of the body of the finished propeller blade. To the opposite sides of this board is intimately attached, as by gluing or other suitable adhesive, a separate strip or board of like material of such dimensions as to permit the ultimate forming of the shank of the blade in the most efficient and economical manner.

The shank and then the blade proper are turned down and contoured on a profile machine having a master pattern to permit the completed blade to be turned down or formed in single or simultaneous multiple units whereby to always assure accuracy and actual conformation with the master pattern.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Fig. 1 is a view in end elevation of the finished blade.

Fig. 2 is a plan or elevational view thereof.

Fig. 3 is a series of views in vertical cross section taken on the lines a—a, b—b, c—c, d—d, e—e, f—f and g—g of Figs. 1 and 2, respectively.

Fig. 4 is a fragmentary perspective view showing the laminated construction of the blade.

Fig. 5 is a view in end elevation of the laminated structure before the blade is formed.

Fig. 6 is a plan view of the laminated structure shown in Fig. 5.

Fig. 7 is a view in vertical cross section taken on the line 7—7 of Fig. 6.

Fig. 8 is an enlarged view in side elevation of the sheet or board to be attached to the main section to form the shank of the blade with the broken line showing where the cut is taken.

Referring more particularly to the disclosure in the drawing, the novel propeller blade 1 is shown in Figs. 1 and 2 in its completed form after its blade surface and shank 2 have been turned down or contoured to the desired shape, the shape of the blade being clearly shown in cross section in the composite view of Fig. 3.

In preparing the laminated wood for turning, the main board or slab 3 is shown of substantially rectangular form and of the ultimate dimensions of the body of the propeller blade. To the opposite sides of this board or slab is securely affixed, as by gluing or the like, complementary sections 4, 4 of another board or slab 5. This board or slab is shown in Fig. 8 with the broken line 6 showing where the board or slab is cut to form the complementary sections. As shown in Figs. 6 and 7, these sections are of less width than the board or body 3 of the blade and secured to this board in staggered relation, thus effecting an appreciable saving in the material used.

After the laminated wood necessary to form the ultimate blade is formed into an integral unit as in Figs. 5, 6 and 7, the ends of the unit are centered on a profile machine having a master pattern whereby the blade is assured of accuracy and precise conformation with the master pattern. In this turning operation, the shank is first turned to its proper dimensions and contour and the blade proper is then turned down in accordance with the contour thereof as shown in Figs. 1, 2 and 3. The resultant blade is a compact and compressed laminated wood structure wholly of compressed and treated wood having great inherent strength and maximum resistance to distortion or damage under operating conditions.

The laminated layers are preferably in the form of a relatively hardwood veneer impregnated with a phenol-formaldehyde resin, after which a stack of suitable thickness of the impregnated layers or sheets is placed into a heated press under extremely high pressure and squeezed or pressed into a fraction of its original thickness. After the compressed board composed of a great many laminations is maintained for a predetermined or desired length of time under the proper temperature and pressure, the resin reacts chemically and the resultant structure becomes a highly compressed wood in which the fibers are impregnated by the resultant Bakelite.

The shank 2 is tapered and formed with an offset or shoulder 7 in such manner as to interlock with its hub mounting to prevent sheering or dislodgement of the blades. After the blades have been completed, they are preferably dipped in a hot oil bath for tempering the wood and providing a smooth, polished surface adapted to withstand continuous hard usage, give optimum efficiency, and eliminate collection of condensate or moisture, thereby preventing ice formation on the blades.

Having thus disclosed the invention, I claim:

The method of constructing a propeller blade of laminated wood impregnated with a resin and compressed to form a compact laminated wood blade of great inherent strength and resistance to distortion or damage under operating conditions, comprising the steps of forming a rectangular slab of laminated and resin impregnated wood, forming complementary strips of similar laminated and resin impregnated wood tapering in thickness from end to end and of less length and width than the rectangular slab, adhesively applying said strips to the opposite faces of the rectangular slab at one end thereof in such manner that the ends of said strips having the greatest thickness are joined to the adjoining end of the slab to form the thickened shank end of the propeller blade with a strip on one side of said rectangular slab having one of its longitudinal edges aligned with a longitudinal edge of the slab and a strip on the opposite side of said slab having one of its longitudinal edges aligned with the opposite edge of the slab, and forming the shank and finished blade from the composite slab and strips.

PIERINO DI CESARE.